March 21, 1933.    D. M. SMITH    1,901,992
LAWN EDGER AND TRIMMER
Filed Aug. 14, 1931    2 Sheets-Sheet 1

D. Montgomery Smith
Inventor
Thomas Bilyeu
Attorney

March 21, 1933.  D. M. SMITH  1,901,992
LAWN EDGER AND TRIMMER
Filed Aug. 14, 1931  2 Sheets-Sheet 2

D. Montgomery Smith
Inventor
Attorney

Patented Mar. 21, 1933

1,901,992

UNITED STATES PATENT OFFICE

D. MONTGOMERY SMITH, OF PORTLAND, OREGON

LAWN EDGER AND TRIMMER

Application filed August 14, 1931. Serial No. 557,095.

My invention relates to lawn trimmers. It has for its purpose and object the trimming of borders, edgings and the like.

The invention is comprised primarily of a supporting drum upon the outer surface of which is placed a corrugated rubber band, or tire for engaging the sidewalk, or curb edge, or lawn surface and for driving a hardened toothed cutting blade. A tooth cutting blade is secured to the drum and outwardly extends therefrom and is secured to the drum and is adapted for being driven thereby. A pair of handle supporting shanks are secured to the journal bolt upon their one end. The oppositely disposed ends of the handle supporting shanks form an attaching socket into which a handle may be removably secured. A hardened offset finger bar downwardly extends from one of the handle receiving members and precisely engages one side of the teeth of the cutting blade and in conjunction with the teeth forms a shear for cutting material being fed therebetween. The finger is so shaped as to act as a conductor for passing the material to be cut between the finger bar and the teeth. The finger bar is upset, upon its inner side to a greater thickness than that of the cutting blade to thereby prevent the cutting blade contacting sidewalks, curbings and the like. Means is provided for maintaining a suitable working relationship between the finger bar and the toothed cutting wheel.

One of the objects of my invention consists in providing a simply constructed device that is comprised of a minimum number of parts and that will be effective in the trimming of the borders and edges of lawns.

A further object of my invention consists in providing an inexpensive device that is comprised of few parts and that may be efficiently used by any one in the trimming of edges and borders of lawns.

Heretofore it has been the general custom to trim the edges and the borders with a shearing tool where the edge of the border is sheared down including the sod, or to use a hand sickle, or a pair of shears. Each of these methods have been laborious in their use and each require a large amount of time, and in many instances leaves litter and dirt upon the lawns, sidewalks and along the border being conditioned.

A further object of my invention consists in providing an edging tool that may be used while standing in an erect position.

Through the use of my new and improved device the edge of the lawn may be left in fine condition and the work be done quickly and without the use of skill and without the expending of fatiguing effort.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
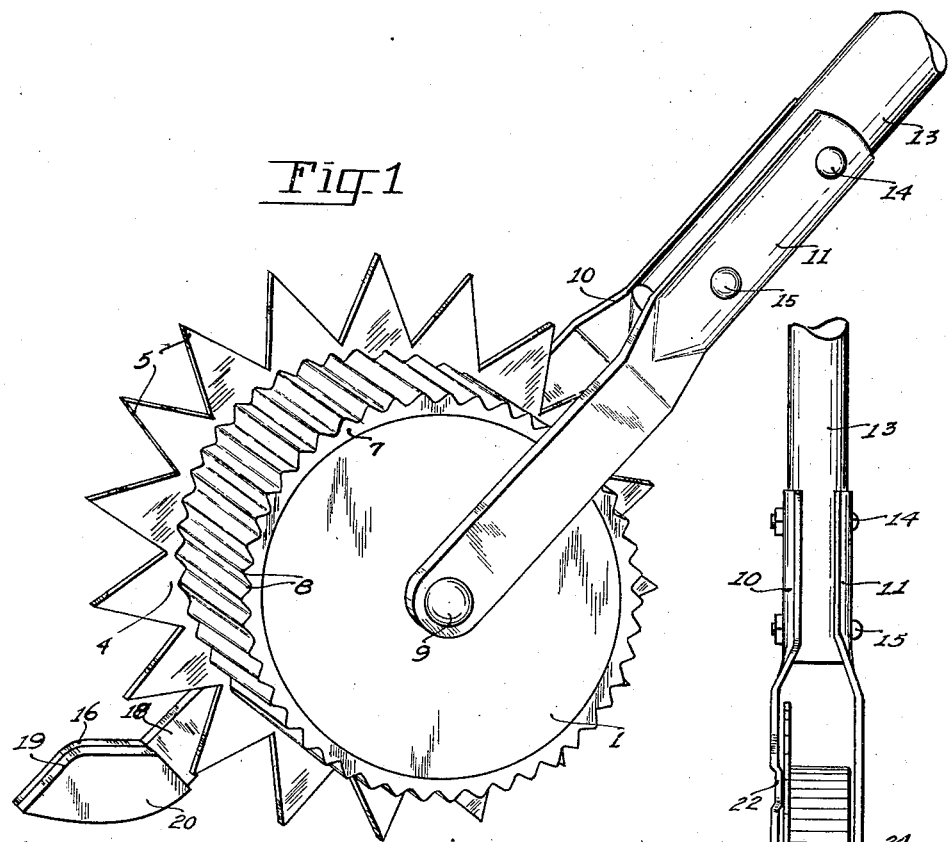
Fig. 1 is a perspective, side view, of the assembled device.
Figure 3:
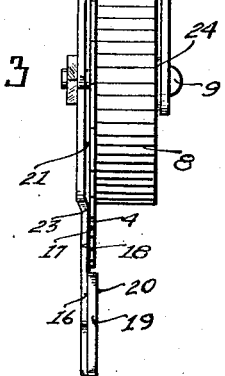
Fig. 3 is a top, plan view, of the assembled device, the same being taken on line 3—3 of Fig. 2, looking in the direction indicated.
Figure 2:
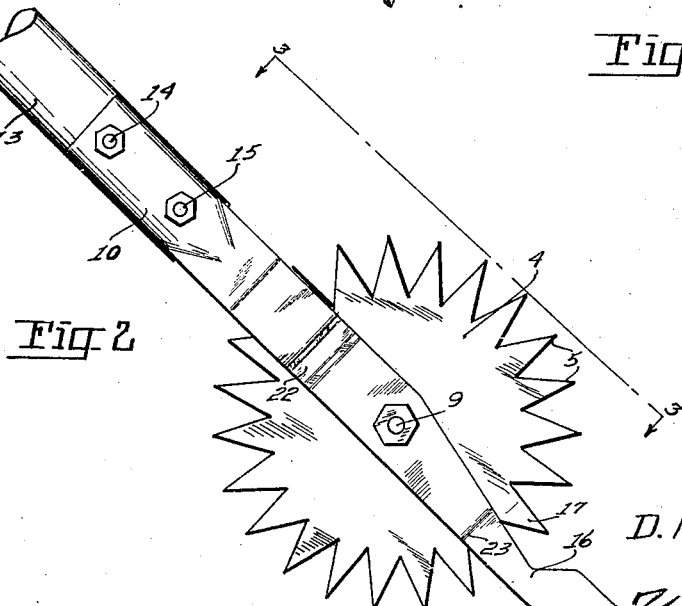
Fig. 2 is a side view, of the assembled device.
Figure 4:
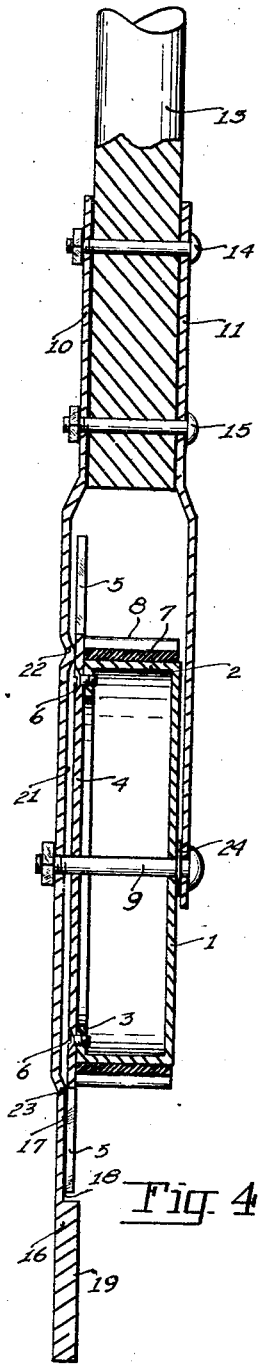
Fig. 4 is a sectional, plan view, of the assembled device.
Figure 5:
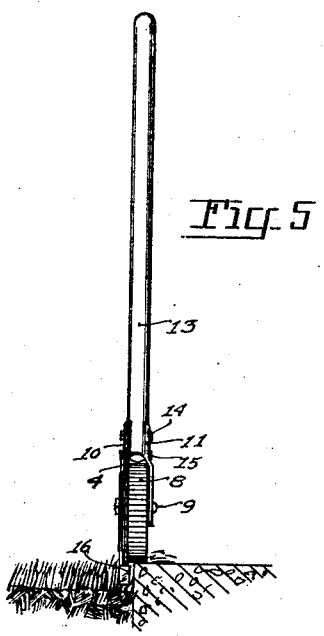
Fig. 5 is a front view of one of my new and improved devices shown in position for trimming the edges of a lawn tributary to a sidewalk, or curbing and wherein my new and improved device is made to travel along the top and adjacent the edge of the sidewalk, or curbing.
Figure 6:
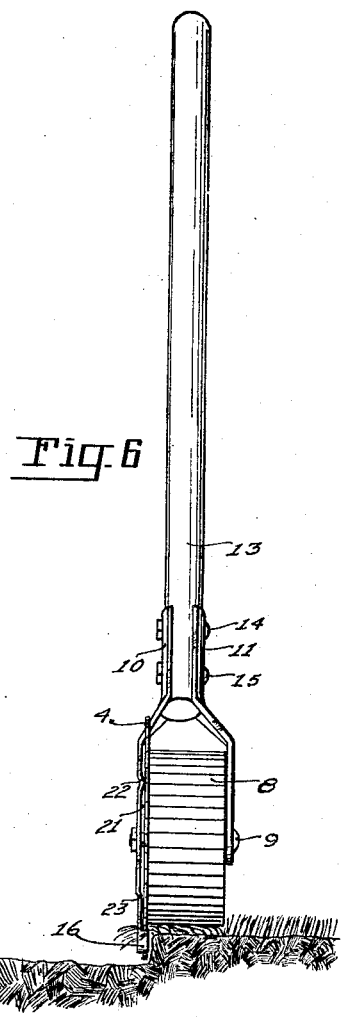
Fig. 6 is a front view, of one of my new and improved devices illustrated as being used in the trimming of the edge of the lawn and adjacent a flower bed.
Figure 7:
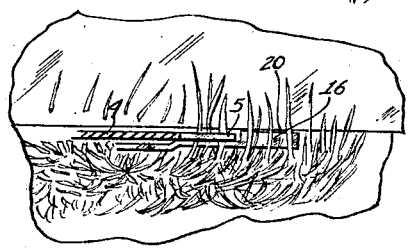
Fig. 7 is a fragmentary, sectional, top, plan view of the guard and tooth illustrating the relationship of the finger guard to the tooth. This view illustrates the upset end of the finger guard which is made to engage the surface of the sidewalk, or curbing and to prevent the cutting teeth from contacting the same.

My invention is primarily comprised of a drum having a side wall 1 and a cylindrical band 2 terminating in the outer peripheral edge of the side wall 1. A flange 3 is parallelly disposed to the side wall 1 and extends inwardly from the band. The flange permits fastenings to be passed thereinto to secure the cutting blade to the flange.

My cutting blade is comprised of a sheet of suitable hardened material 4. Pointed, spaced teeth 5 form the outer periphery of the hardened circular sheet. The hardened toothed sheet is secured to the flange by any suitable fastening means, as through the use of counter-sunk screws 6.

I place a rubber tire, or band 7, made of suitable material, about the cylindrical portion of the drum and secure the same thereto. I roughen the outer surface of the rubber tire, or band, as by corrugating the same, as illustrated at 8 to aid in the tractive efficiency of the rubber band. A journal bolt 9 passes through the center of the cutting blade 4 and the side wall 1. A pair of side handle receiving bars 10 and 11 are journaled about the journal bolt 9. A handle socket is formed in the upper ends of the bars 10 and 11 to receive a handle 13 therebetween. Fastening bolts 14 and 15 are provided for removably securing the handle to the bars. One of the bars has a hardened finger 16 downwardly extending from its lower end that is so shaped at its upper surface as to conduct the materials to be cut into the notches of the cutting blade. The outer surface 17 of the cutting teeth is made to precisely engage the inner surface 18 of the finger 16 to form a shearing action therebetween. The lower end of the finger 16 is upset as illustrated at 19 to form a greater width of the upset than the total thickness of the tooth so that the inner surface 20 of the upset portion will directly engage the sidewalk, or the curb and prevents any portion of the teeth engaging the wall of the walk, or the curb when the tool is in its normal position of use.

The side wall member 10 is so shaped that a recess 21 is disposed between the side bar 10 and the outer surface of the cutting blade. A precise working relationship is maintained between the side bar 10 and the cutting blade by having insets 22 and 23 provided therein to adapt the same to precisely engage the cutting blade at predetermined points only. This lessens the frictional engagement between the cutting blade and the side bar 10 and at the same time permits of a precise adjustment between the side bar 10 and the cutting blade. The side bar 11 is spaced apart from the outer surface of the side wall 1 of the drum, as through the use of a spacing washer 24.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a cylindrical drum, formed of a single piece having a side wall disposed upon one side of the cylinder portion, and a flange disposed upon the oppositely disposed side, a toothed blade made of hardened material secured to the flanged side of the drum by counter-sunk screws, a tire band of corrugated rubber secured to the outer surface of the drum, a journal bolt passing through the axis of revolution of the drum and the blade, handle receiving side bars journaled about the bolt, a handle receiving socket disposed upon the outer end of the side bars, and a handle removably disposed therein and secured thereto by fastening bolts, a feeding finger terminating the outer end of one of the side bars, said feeding finger being upset upon its outer end to form a protector for the teeth of the blade and to act as a guide for the grass to be cut, the side bar carrying the feeding finger being spaced apart from the blade for the greater portion of its length and the oppositely disposed side bar being spaced apart from the side wall of the drum by a spacing washer, an offset on the finger carrying side bar adapted to engage the toothed blade at the outer circumference of the untoothed portion of the toothed blade between the handle and the journal bolt, a similar offset engaging the toothed blade on the side diametrally opposite the handle and adapted to coact with the blade and its teeth, a cutting edge disposed upon the portion of the offset adapted to coact with the teeth, both offsets being adapted to maintain the proper alignment of the toothed blade with the cutting edge.

2. In a device of the class described, the combination of a cylinder, a flange disposed at one side of the cylinder, a cutting blade removably secured to the flange of the cylinder, spaced teeth formed upon the peripheral edge of the cutting blade, a side bar adapted to coact with the teeth and having a hardened conducting finger terminating its lower end and adapted for conducting grass to be cut into the teeth, offsets in the side bar adapted to engage the cutting blade and to maintain the alignment of the side bar and the teeth of the cutting blade, a handle receiving socket disposed upon the oppositely disposed end of the side bar, a second side bar having a handle receiving socket disposed upon its one end, a journal bolt common to the side bars, each of the side bars being journaled about the bolt, a handle disposed within the handle receiving socket formed by the side bars, and a rubber tire disposed upon the outer surface of the cylinder.

3. In a device of the class described, the combination of a cylinder, a cutter blade removably secured to the cylinder, a journal bolt passing through the cylinder and the cutter blade, a pair of side bars journaled about the journal bolt and adapted for having a handle secured thereto, offsets in the side bar adapted to maintain the alignment of the side bar and the teeth of the cutting blade, a hardened conducting finger adapted to coact with the teeth of the cutting blade and adapted to conduct materials to be cut into position for cutting by the coaction of the cutter blade and the conducting finger and a rubber tire disposed upon the outer surface of the cylinder.

4. In a device of the class described, the combination of a rubber tired cylinder, a cutting blade having spaced teeth upon its outer periphery removably secured to the cylinder, side bars journaled relative to the cylinder offsets in the side bar adapted to maintain the alignment of the side bar and the cutting blade, a handle removably secured to the side bars, a conducting finger terminating the lower end of one of the side bars, and an offset inwardly extending at one side of the lower end of the finger, said offset being of a greater thickness than the normal thickness of the teeth of the cutting blade.

5. In a device of the class described, the combination of a cylindrical drum having a corrugated band of rubber disposed around its periphery, a toothed circular saw blade fixedly secured to one end of the drum, a supporting bolt revolubly disposed thru the drum and blade coincident with their axis of revolution; a pair of supporting arms disposed about said bolt, a handle connected to the supporting arms; offsets disposed in the supporting arm which is adjacent the cutting blade, adapted to engage the blade near its periphery at diametrally opposite points; an extension on the offset-bearing arm extending past the rotating teeth, and having an upset portion thereon adapted to direct material to be cut into the saw teeth, and to protect the cutting teeth.

D. MONTGOMERY SMITH.